June 26, 1962    J. GARDBERG    3,041,519
MOTOR CONTROL CIRCUIT
Filed April 24, 1959    2 Sheets-Sheet 1

INVENTOR
Joseph Gardberg
By
John L. Niegreffe
ATTORNEY

June 26, 1962     J. GARDBERG     3,041,519
MOTOR CONTROL CIRCUIT

Filed April 24, 1959     2 Sheets-Sheet 2

INVENTOR.
Joseph Gardberg
BY
ATTORNEY

United States Patent Office 3,041,519
Patented June 26, 1962

3,041,519
MOTOR CONTROL CIRCUIT
Joseph Gardberg, Chicago, Ill., assignor to Admiral Corporation, Chicago, Ill., a corporation of Delaware
Filed Apr. 24, 1959, Ser. No. 808,712
7 Claims. (Cl. 318—467)

This invention relates to improvements in motor control devices.

In certain motor control devices of the prior art, notably in the field of remotely controlled television receivers, a relatively short duration signal is employed to initiate circuitry for operating a motor. A programming means is mechanically coupled to the motor and is preset to stop the motor at certain points. In the environment referred to above these points correspond to the preselected station positions on the television receiver tuner. Since the control devices referred to generally employ vacuum tube operated relays for operating the motor, it has been necessary to provide a means for maintaining the motor energized after the short duration control signal has subsided.

One commonly used method involved closing a parallel operating path to the motor through a pair of contacts on the programming means, or program wheel as it is generally referred to. However, such things as tuner motor friction loading, relay holding time and variable operating characteristics of vacuum tubes often resulted in the operating relay being restored before the program wheel had rotated sufficiently to complete the parallel path to the motor.

In another circuit of the prior art a solution to this problem was devised which, in effect, placed a holding circuit having a predetermined time constant on the control grid of the vacuum tube. This circuit has proven satisfactory but has the disadvantage of requiring that the time constant of the holding circuit be long enough to insure the establishment of the parallel path to the motor, yet short enough to insure that the vacuum tube will not be conducting when the program wheel reaches the next preset position. If the first condition prevails, the motor will not operate in response to the control signal. In the second case, the relay will still be energized (consequently the original operating path for the motor will still exist) and the motor will not be stopped by the program wheel operation.

To obviate the difficulties encountered in connection with the above mentioned circuits of the prior art, this invention incorporates circuitry for holding the vacuum tube operated without a limiting time constant and includes means responsive to the program wheel for quickly deenergizing the vacuum tube.

It should be understood that the terms conductive and non-conductive used throughout are relative and are used to indicate that the relays controlled by the tubes will either operate or restore.

Accordingly, it is the object of this invention to provide an improved motor control circuit of the type that is initiated by a control signal of relatively short duration.

A feature of this invention is the provision of a holding circuit having no limiting time constant in conjunction with means for quickly deenergizing the control circuit.

Other objects and features of this invention will be apparent upon a reading of the specification taken in conjunction with the drawings in which.

Figure 1:
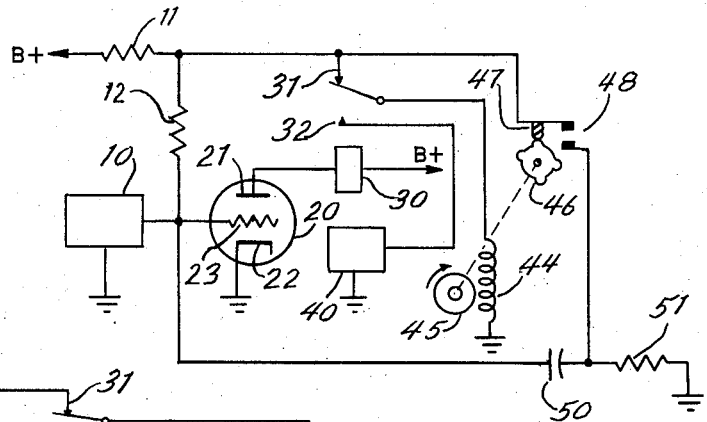
FIG. 1 is a schematic diagram of a motor control circuit which incorporates one form of the invention.

Referring now to FIG. 1, a vacuum tube 20 having a grounded cathode 22, a control grid 23 and a plate 21 is shown. A source of control signals 10, which control signals should be understood to be of relatively short duration i.e., of a transient nature, is connected to grid 23. A relay 30 is interposed between a source of positive potential B+ and plate 21. An A.C. potential source 40 is arranged to supply a motor winding 44 through a contact 32 of relay 30 for operating unidirectional motor 45. A program wheel 46, which is mechanically coupled to motor 45 as indicated by the dashed lines joining these components, and which has a series of cam lobes on its periphery for actuating a set of contacts 48 responsive to movements of cam follower 47, is provided. A source of positive potential B+ is connected through resistors 11 and 12 to grid 23. The junction of resistors 11 and 12 is connected to contact 31 of relay 30 and to the movable member of contacts 48. A capacitor 50 is connected between grid 23 and a grounded resistor 51. The junction of capacitor 50 and resistor 51 is connected to the fixed member of contact 48.

In operation biasing means (not shown) included in control signal source 10 hold tube 20 substantially non-conductive. Hence relay 30, which is connected in the output circuit of tube 20, is not energized. Although grid 23 is connected through resistors 11 and 12 to B+, grid 23 is not driven positive due to the direct current ground applied through motor winding 44 and normally closed contact 31 to the junction of resistors 11 and 12.

In response to a control signal from signal source 10, grid 23 is driven positive with respect to cathode 22 and tube 20 conducts. Relay 30 now operates and the opening of contact 31 removes the ground from the junction of resistors 11 and 12. This allows B+ to be impressed on grid 23 through resistors 11 and 12 to provide an effective holding circuit for tube 20. Since, in practice, resistor 12 is very large and further, since the impedance between grid 23 and cathode 22 is quite small when grid 23 is drawing current, substantially all of the voltage drop from B+ to grounded cathode 22 occurs across resistor 12. At contact 32, relay 30 connects A.C. potential source 40 to grounded motor winding 44 and motor 45 operates.

As motor 45 rotates it drives program wheel 46 causing cam follower 47 to ride off of the cam lobe on which it was resting and close contacts 48. The closing of contacts 48 completes a path as follows: from B+, through resistor 11, through contacts 48, to the junction of capacitor 50 and resistor 51, through resistor 51, to ground. The junction of capacitor 50 and resistor 51 is driven positive and capacitor 50 charges through the grid-cathode path to ground. Now when program wheel 46 raises cam follower 47 at the next preset position contacts 48 open and the positive side of capacitor 50 is driven to ground potential through resistor 51. This action places a negative voltage pulse on grid 23 of tube 20 which renders tube 20 non-conductive. Relay 30 quickly restores and at contact 31 grounds the junction of resistors 11 and 12 which disables the holding circuit. Simultaneously at contact 32 A.C. source 40 is disconnected from motor winding 44 and motor 45 stops.

Thus the circuit of FIG. 1 discloses a positive acting motor control device which is initiated by a control pulse and which does not require a holding circuit having a limiting time constant. Consequently problems of tuner motor friction, relay adjustment and vacuum tube characteristics variations have little or no adverse effects on the control device operation.

Figure 2:
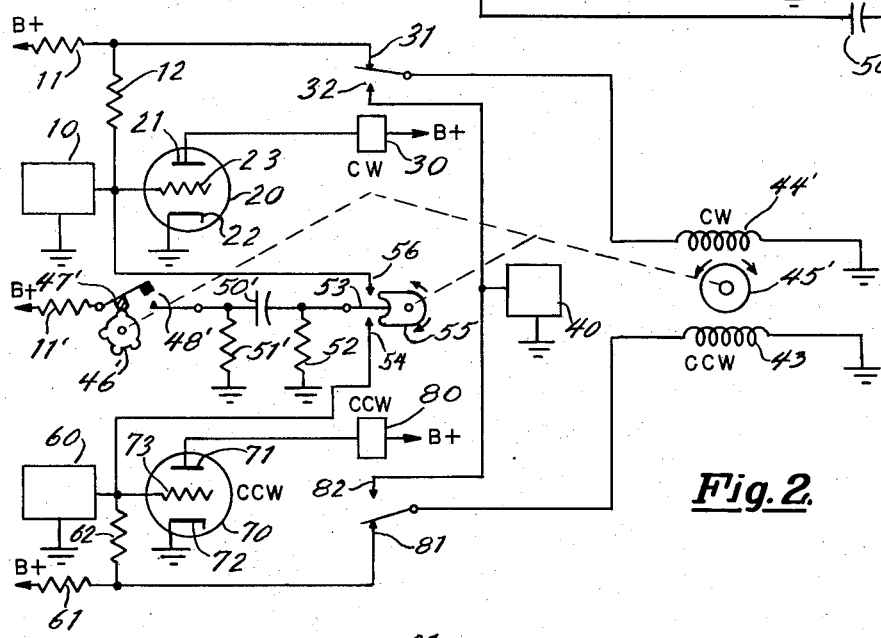
FIG. 2 shows in schematic form a motor control circuit similar to that of FIG. 1 but in which the controlled motor is bidirectional.

In FIG. 2 the invention is embodied in a bidirectional motor control circuit. Like components in FIGS. 1 and 2 are given like reference characters. The upper portion of FIG. 2 is substantially the same as FIG. 1 and provides a control channel for controlling the clockwise rotation of motor 45′. The lower portion of FIG. 2 (counter clockwise control channel) includes a source of control signals 60, a vacuum tube 70 and a relay 80 which are connected in the same manner as their counterparts in the upper portion of FIG. 2. Additionally, a motor running switch 55 is frictionally coupled to the shaft of motor 45′ and moves in the same direction as motor 45′. Running switch 55, after moving a sufficient distance to close spring 53 with contact 54 or 56, is stopped by means (not shown) and slips on the motor shaft. Program wheel 46′ controls the operation of contacts 48′ for connecting positive potential B+ through resistor 11′ to grounded resistor 51′. Capacitor 50′ has one terminal connected to resistor 51′ and the other terminal connected to grounded resistor 52 and spring 53 of running switch 55.

Assuming a control signal emanates from signal source 10, vacuum tube 20 is rendered conductive and operates relay 30. Relay 30 connects A.C. source 40 to clockwise motor winding 44′ through contact 32 and simultaneously enables the holding circuit connected to grid 23 by disconnecting the grounded motor winding 44′ from the junction of resistors 11 and 12. Motor 45′ operates in a clockwise direction. As program wheel 46′ is driven, contacts 48′ close and a positive potential is developed at the junction of resistor 51′ and capacitor 50′. At substantially the same time, running switch 55 connects the junction of capacitor 50′ and resistor 52, through spring 53, and contact 56, to grid 23 of tube 20, capacitor 50′ charges through the parallel combination of resistor 52 and the grid-cathode path of tube 20. When program wheel 46′ reopens contacts 48′ at the next preset position the positive side of capacitor 50′ is driven to ground through resistor 51′, and as in FIG. 1 a negative pulse is applied to grid 23 to cut off tube 20. Relay 30 restores switching grounded motor winding 44′ from A.C. source 40 to the junction of resistors 11 and 12. Thus, motor 45′ is deenergized and the holding circuit connected to grid 23 is disabled in the same manner described in FIG. 1.

Counter clockwise operation of motor 45′ in FIG. 2 is effected in a similar manner when a control signal from signal source 60 initiates conduction in tube 70. Relay 80 operates and motor winding 43 is energized. Running switch 55, in moving counter clockwise, connects the junction of capacitor 50′ and resistor 52, through contact 54, to grid 73 of tube 70. Now, when contacts 48′ are opened, effectively grounding the positive side of capacitor 50′, the negative pulse is applied to grid 73 of tube 70 and renders tube 70 non-conductive. Relay 80 restores and reconnects grounded motor winding 43 to the junction of resistors 61 and 62 to disable the holding circuit of tube 70.

Figure 3:
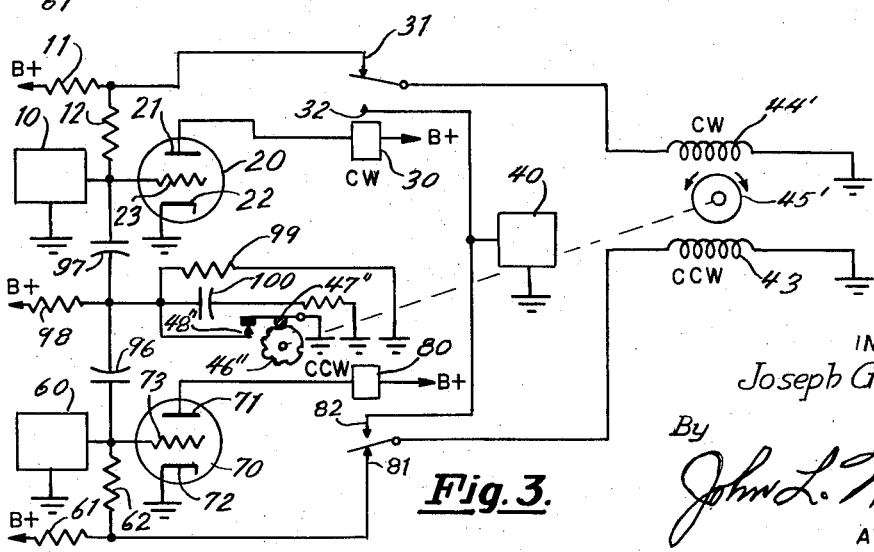
FIG. 3 shows a modification of the invention applied to the circuitry of FIG. 2.

In FIG. 3 a modification of the circuitry of FIG. 2 is shown. In the main the modification consists in eliminating running switch 55 by sending a "stop" signal to both tube 20 and 70. Of course, since the "stop" signal is a negative voltage pulse, only the operative one of these tubes will be affected.

Grid 23 of tube 20 is connected through capacitors 97 and 96 to grid 73 of tube 70. B+ is connected through resistor 98 to the junction of capacitors 97 and 96. Also connected to this junction area grounded resistor 99, a resistively grounded capacitor 100, and a solid ground through contacts 48″ of program wheel 46″. In this embodiment, the program wheel 46″ is arranged to close contacts 48″ in the preset positions and to open contacts 48″ between these preset positions. In other words contacts 48″ are normally closed whereas contacts 48 and contacts 48′ in FIGS. 1 and 2, respectively, were normally open. Motor 45′ is operated in the same manner as described above in FIG. 2. As program wheel 46″ rotates it removes the ground applied through contacts 48″ from the junction of capacitors 97 and 96 thus placing resistors 98 and 99 in series between B+ and ground. Capacitor 100 acts as a "cushion" or "shock absorber" to absorb the positive voltage surge which would normally be produced when contacts 48″ open and prevents "triggering on" of the non-conductive one of tubes 20 and 70. All three capacitors (96, 97, 100) now charge. When contacts 48″ close at the next preset position, the positive sides of these capacitors are driven to ground and a negative voltage pulse is simultaneously applied to grid 23 of tube 20 and grid 73 of tube 70. The negative pulse applied to the grid of the non-conductive tube has no effect. The negative pulse on the grid of the conducting tube, however, renders it non-conductive and the action previously described with reference to FIG. 2 is repeated.

Figure 4:
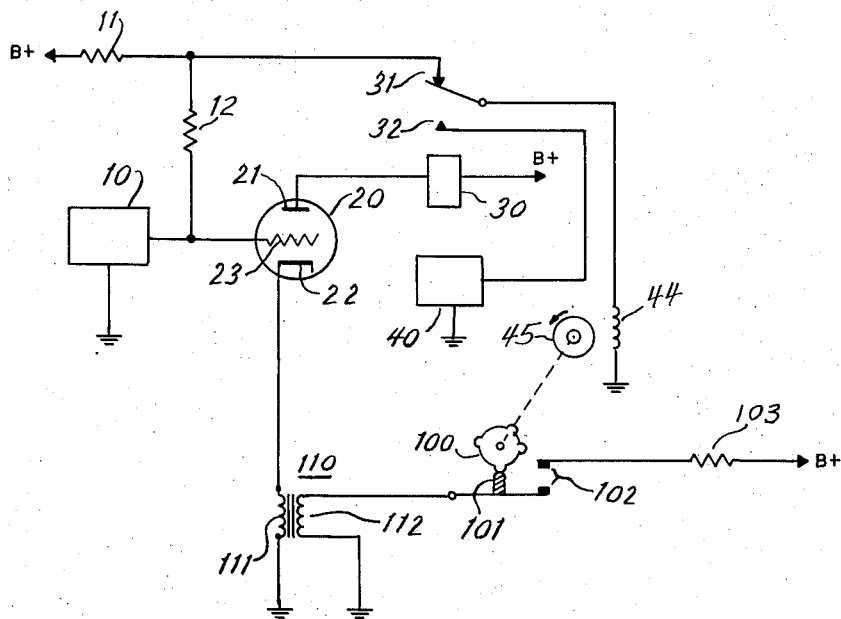
FIGS. 4 and 5 show different forms of the invention applied to the circuit of FIG. 1.

In FIGURE 4 a modified form of the invention is shown applied to the circuitry of FIGURE 1. A transformer 110, having windings 111 and 112, is shown with winding 111 connected in the cathode-ground path of tube 20. Winding 112 is grounded at one end and connected to the movable one of contacts 102 at the other end. Contacts 102 are opened by the action of the cam lobes on program wheel 100 in raising cam follower 101. Upon receipt of an appropriate signal from signal source 10, tube 20 is driven sufficiently conductive to cause operation of relay 30. The opening of contact 31 enables the holding circuit from B+, through resistors 11 and 12, to grid 23 of tube 20 by removing the ground from the junction of resistors 11 and 12. Contact 32, in closing, connects A.C. source 40 to motor winding 44 which actuates motor 45. As motor 45 rotates, program wheel 100, which is mechanically coupled thereto, rotates. Cam follower 101 rides off of the cam lobe on which it is resting and closes contacts 102. Contacts 102 connect a source of positive potential B+, through a resistance 103 to winding 112 of transformer 110. The current surge in winding 112 of transformer 110 generates a relatively steep front voltage pulse. Transformer winding 111 is so connected with respect to transformer winding 112 that the above mentioned voltage surge produces a negative potential at the top of transformer winding 111. As tube 20 is already drawing substantial current, driving cathode 22 more negative only tends to increase the plate-cathode current flow and relay 30 remains operated. Transformer 110 quickly saturates due to the direct current flowing through winding 112. As program wheel 100 rotates, the next succeeding cam lobe raises cam follower 101 which opens contacts 102 and removes the B+ voltage from winding 112. The flux in transformer 110 decays rapidly, generating a sharp positive voltage pulse at the top of winding 110. This positive pulse applied to cathode 22 has the effect of reducing conduction in tube 20 sufficiently to cause restoration of relay 30. A.C. source 40 is disconnected from motor winding 44 by contact 32 and motor 45 stops. The action of contact 31 reconnects grounded motor winding 44, to the junction of resistors 11 and 12 to disable the holding circuit.

Figure 5:
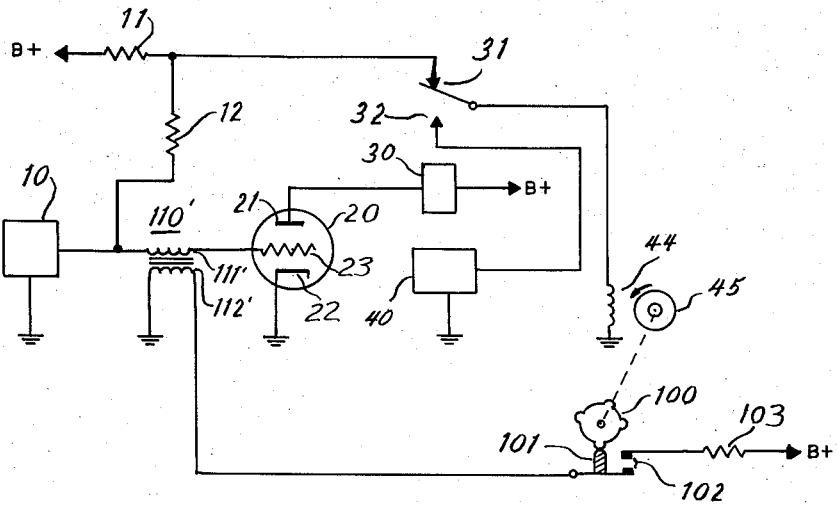

In FIG. 5 a circuit similar to the circuit of FIGURE 4 is shown with a transformer 110′ having a winding 111′ and a winding 112′. Winding 111′ is connected between signal source 10 and grid 23 of tube 20. Grounded winding 112′ is connected to the movable one of contacts 102. The stationary one of contacts 102 is connected through a resistance 103 to B+. The operation of this circuit is substantially the same as the operation of the circuit of FIGURE 4, the difference being in the means for cutting tube 20 off in response to operation of program wheel 100.

A control signal from signal source 10 renders tube 20 sufficiently conductive to operate relay 30. Relay 30 in operating enables the aforementioned holding circuit comprising B+ and resistors 11 and 12 and connects A.C. source 40 to motor winding 44 to cause motor 45 to operate. As motor 45 operates program wheel 100 rotates and contacts 102 close. Winding 112′ of transformer 110′ is energized from B+ and, as was described for FIG. 4, windings 112′ and 111′ are arranged such that a positive voltage pulse appears at the grid side of winding 111′. As tube 20 is already conductive, this positive voltage pulse on its grid merely aids conduction. As program wheel 100 moves to the next preset station tuning position, contacts 102 are opened and winding 112′ is deenergized. A sharp negative pulse is generated at the grid side of winding 111′, which pulse is sufficient to reduce conduction in tube 20 sufficiently to cause restoration of relay 30. Thereafter, the circuit operation is the same as that described in connection with FIGURE 4.

What has been described in an improved motor control circuit in which the motor is actuated by control signals of relatively short duration and stopped by a preset program wheel. In this connection the program wheel is preferably of the type having a series of adjustable cam lobes circumferentially located about it. One common type uses substantially semi-circular headed screws. A half turn with a screwdriver is all that is required to set up (or remove) a cam lobe in a given position. In general, when used in television applications, cam lobes would be established in positions corresponding to local television station tuning points. It will, of course, be understood that the specific embodiments used for illustrating the operation of the invention should not be construed as a limitation thereon, but that the invention is limited only as defined in the claims.

What is claimed is:

1. A control device for a bidirectional motor comprising; first and second control channels, each said channel including, energizing means adapted to operate said motor in one of its two directions in response to a control signal and holding means for maintaining the operated one of said energizing means operated; programming means mechanically coupled to said motor; charging means energized upon operation of said programming means; a direction sensitive switch mechanically coupled to said motor for connecting said charging means to the operated one of said energizing means, said charging means effective upon restoration of said programming means to deenergize the operated one of said operating means.

2. A control device for a bidirectional motor comprising; a pair of control channels coupled to said motor; each said channel including energizing means and holding means coupled thereto; each said energizing means adapted to operate said motor in one of its two directions in response to a control signal, each said holding means adapted to maintain its associated energizing means operated; programming means mechanically coupled to said motor; restoring means coupled to both said energizing means, said restoring means including capacitance means charged upon operation of said programming means and discharged upon restoration of said programming means.

3. In combination; a motor having a source of power; a program wheel having a plurality of preset cam lobes on the periphery thereof mechanically coupled to said motor; contact means operated by said cam lobes and restored between said cam lobes; a normally non-conductive electron discharge device having an input circuit and an output circuit; output means included in said output circuit; holding means coupled to said input circuit, said holding means normally held disabled by said output means; said input circuit rendering said electron discharge device conductive in response to a control signal, said output circuit energized in response to conduction in said electron discharge device and energizing said output means; said output means simultaneously connecting said power source to said motor and enabling said holding circuit; and energy storage means coupled to said electron discharge device for storing energy responsive to operation of said contact means and for releasing said stored energy in the form of a voltage pulse of particular polarity responsive to restoration of said contact means, said pulse being effective to decrease conduction in said electron discharge device sufficiently to deenergize said output means.

4. A motor control device adapted for operation in response to a control signal of limited duration comprising; a motor and a source of power therefor; a programming switch mechanically coupled to said motor for stopping said motor at preselected positions of said programming switch; a normally nonconductive electron discharge device having an input circuit and an output circuit; said discharge device being rendered conductive responsive to said control signal being impressed upon said input circuit; a relay in said output circuit energized responsive to conduction in said discharge device; a holding circuit coupled to said input circuit for maintaining said discharge device conductive upon energization of said relay, said relay also connecting said source of power to said motor; and energy storage circuit means coupled between said programming switch and said input circuit, said last mentioned means effective to store energy when said programming switch is between any of said preselected positions, said energy storage means applying a voltage pulse to said input circuit of proper magnitude and polarity to override said holding circuit when said programming switch is in any of said preselected positions.

5. A motor control circuit adapted for operation in response to an electrical control impulse comprising; a motor; an alternating current power source for said motor; a programming switch coupled to said motor, said switch having program contacts adapted to open at only preselected angular positions of said programming switch; a normally nonconductive vacuum tube including an anode, a cathode, and a control electrode; a direct current voltage source having a positive and a negative terminal; a relay including an energizing winding, a first contact set and a second contact set; said energizing winding being connected between the anode of said tube and said positive terminal, said first contact set interposed between said alternating current source and said motor; a first and a second resistor in series connection between said positive terminal and said grid; a capacitor and a third resistor in series connection between said grid and said negative terminal; said program contacts interposed between the junction of said first and said second resistors and the junction of said capacitor and said third resistor; said second contact set being connected between said first mentioned junction and said motor for maintaining the direct current potential of said first mentioned junction at substantially the potential of said negative terminal; and means for applying said control impulse to said grid to initiate conduction in said valve and energize said energizing winding; said first contact set operating to complete a circuit between said alternating current source and said motor, said second contact set operating to allow the direct current potential of said first mentioned junction to rise toward the potential of said positive terminal, said rise in potential initiating current flow between said grid and said cathode to maintain conduction in said tube; said program contacts upon closure allowing said capacitor to charge whereby upon subsequent opening of said program contacts said capacitor transmits a negative pulse to said grid to terminate conduction in said tube.

6. A motor control device adapted for operation in response to a control signal comprising: a motor having a programming switch mechanically coupled thereto, said programming switch including a set of contacts; a normally nonconductive discharge device; a relay coupled to said discharge device and controlled thereby, said discharge device being rendered conductive in response to said control signal to operate said relay; a power source for said motor; a holding circuit coupled to said discharge device for maintaining said discharge device conductive, said relay simultaneously connecting said power source to said motor and enabling said holding circuit; and energy storage means for storing energy responsive to said set of contacts assuming a first position, said energy storage means being coupled to said discharge device and releasing said stored energy in the form of a pulse of predetermined amplitude and polarity responsive to said set of contacts assuming a second position, said pulse being effective to override said holding circuit and drive said discharge device nonconductive.

7. In combination in a motor control device, a motor having a source of power; a preset program switch mechanically coupled to said motor; a normally nonconductive electron discharge device having an input circuit and an output circuit; output means included in said output circuit; holding means coupled to said input circuit, said holding means normally held disabled by said output means; means for applying a momentary control signal to said input circuit, said electron discharge device being rendered conductive and energizing said output circuit in response to said control signal, said output means simultaneously connecting said source of power to said motor and enabling said holding circuit; capacitance means coupled between said input circuit and said program switch, said program switch completing a charging circuit through said input circuit for said capacitance means upon a first operation, said program switch breaking said charging circuit upon a subsequent operation thereof, whereby said capacitance means delivers an energy pulse to said input circuit which is effective to override said holding circuit and drive said electron discharge device nonconductive.

References Cited in the file of this patent

UNITED STATES PATENTS

| | | |
|---|---|---|
| 2,808,557 | Smith | Oct. 1, 1957 |
| 2,890,274 | Guyton | June 9, 1959 |
| 2,897,354 | Bourget et al. | July 28, 1959 |